Dec. 15, 1942.   C. P. POND   2,305,444
SYSTEM FOR TRANSPORTING FREIGHT
Filed Nov. 4, 1939
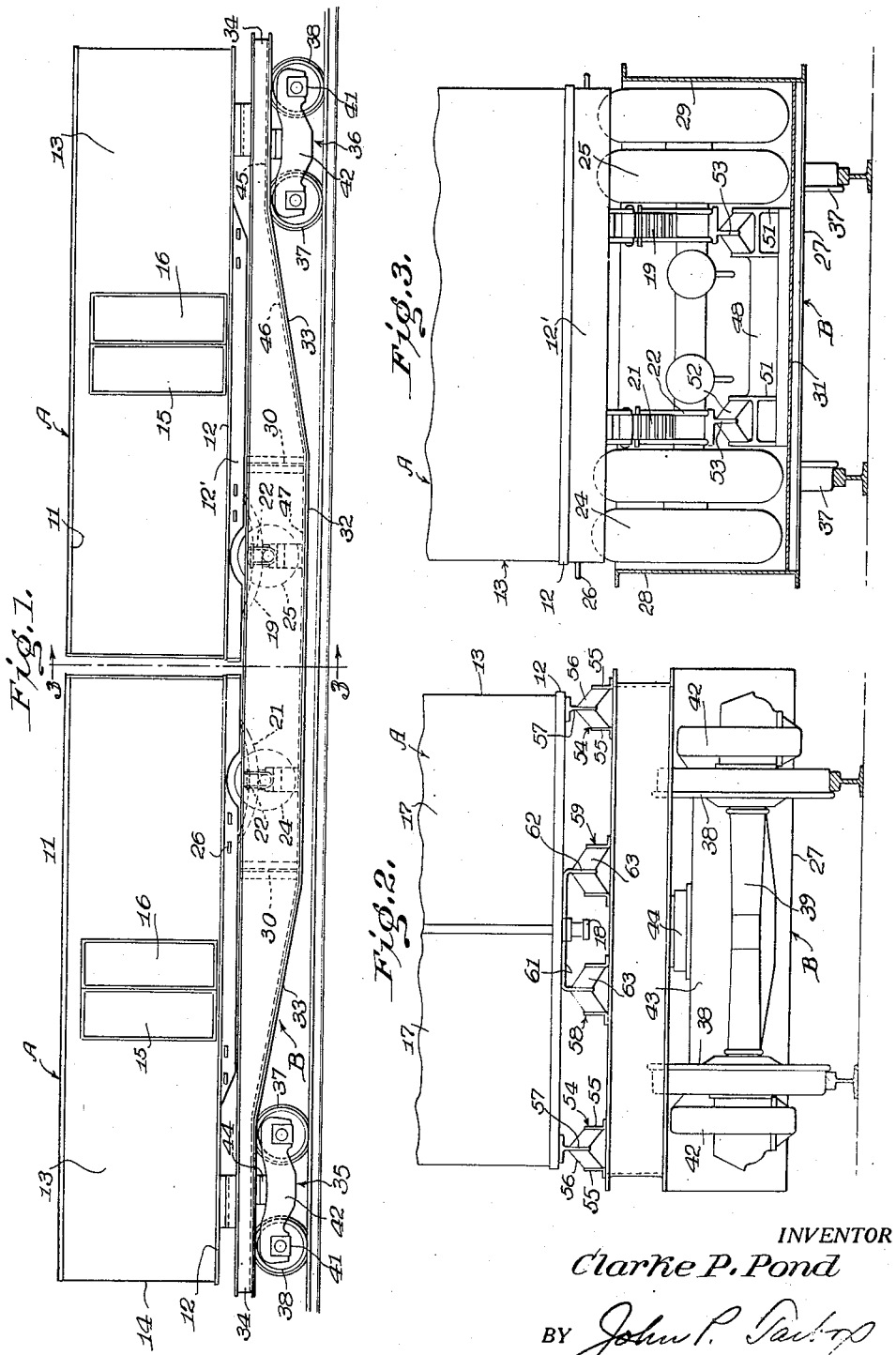
INVENTOR
Clarke P. Pond
BY John P. Saxton
ATTORNEY Patented Dec. 15, 1942

2,305,444

UNITED STATES PATENT OFFICE 2,305,444

SYSTEM FOR TRANSPORTING FREIGHT

Clarke P. Pond, Philadelphia, Pa., assignor to Edward G. Budd Manufacturing Company, Philadelphia, Pa., a corporation of Pennsylvania Application November 4, 1939, Serial No. 302,820

7 Claims. (Cl. 105—159)

This invention relates in general to an improved method and means for transporting freight, having for its principal object the provision of a rail car designed and adapted to so accommodate a plurality of automobile trailers as to permit their convenient loading and unloading directly from railway platforms and while still in the rail car.

Another object is to provide the combination of a special type of flat rail car and coacting means on an automobile trailer body, whereby the latter may be loaded and unloaded without removal from the rail car, and, when desired, bodily lifted from the rail car for highway operation, or replaced therein with full contents for rail transportation to the desired location.

Another object is the provision of an improved system of handling and transporting freight wherein novel means in a rail car and coacting means on an automobile trailer body are effective to achieve a substantial economy in time, labor and expense in the combined railway and highway transportation of freight.

A further object is to provide a rail car having means to operatively accommodate and anchor a plurality of automobile trailer bodies while supporting them at such a height as to register their floor levels with those of the railway loading platforms.

With the foregoing and other objects in view which will appear as the description proceeds, the invention resides in the combination and arrangement of parts, and in the details of construction hereinafter described and claimed, it being understood that various changes in the precise embodiment of the invention herein disclosed may be made within the scope of what is claimed without departing from the spirit thereof.

The invention will be best understood by reference to the drawing wherein:

Figure 1 is a side elevational view of an embodiment of the invention, showing the means provided in the rail car to anchor and support a pair of automobile trailer bodies in such wise as to position their floor levels at a plane substantially flush with those of the railway loading platforms;

Figure 2 is a fragmentary elevational view, showing, among other details, the means employed for supporting and anchoring the front end of the trailer to the rail car; and Figure 3 is a fragmentary transverse sectional view, taken on the line and as viewed in the direction of the arrows 3—3 of Figure 1, and showing how the running gear of the trailer is supported within the well of the rail car.

Referring more particularly to the drawing wherein similar characters designate corresponding parts in the several views, the letter A designates an automobile trailer of conventional configuration and having a roof 11, floor 12, sides 13 and ends 14. The sides 13 are each provided with a pair of doors 15, 16 located at substantially the same position, the said doors normally closing openings in the sides and providing access to the interior of the trailer, when desired. Other doors also may be provided at either of the ends of the trailers, as indicated generally at 17.

Attached to the under side of the floor 12 at the front end of the trailer A is the customary fifth wheel mounting including the pin 18 for coupling to the tractor or power unit (not shown), while secured to the rear end of the trailer in any suitable manner are the customary springs 19, 21. The springs 19, 21 individually comprise leaf assemblies secured by clips 22 to adjacent portions of the axle 23 on the opposite ends of which pairs of wheels 24, 25 are rotatably mounted. As the running gear of the trailer herein described forms no part of the present invention, the specific details composing same will not be set forth.

Depending from the underframe 12' of the trailer A, a plurality of eye-bolts 26 or similar means is provided for bodily lifting the said trailers from the rail car B, and/or returning them to the position shown, when required. The eye-bolts 26, it will be understood, may be located on the sides 13 of the trailer at points higher up than actually illustrated, if preferred.

The general construction of the trailer bodies, it is to be understood, may be substantially conventional, since this system is adapted to lend itself to the combined highway and railway transportation of freight mainly by the provision of a rail car of a type particularly adapted to removably and coactingly receive conventional type trailer bodies for loading and unloading therefrom while still in the rail car, as indicated above and described more fully in ensuing paragraphs.

In further accordance with this invention, an open, flat-type rail car, designated generally at B and embodying certain desired features, is provided. The frame of the rail car B includes a bottom 27 connected to longitudinally-extending side sills 28, 29 formed of channel or angle iron members and braced by cross members 30. A floor 31 fastened to the side sills 28, 29 and suitably supported in spaced, overlying relation to the bottom 27 is also provided. As indicated in dotted lines in Fig. 1, the lateral edge of the floor 31 follows the contour on the bottom edge of the side sills 28, 29. These side sills, as best shown in Figure 1, have their greatest depth at central portions, as at 32, and slope upwardly therefrom, as at 33, and then horizontally to form extensions 34 to which the running gear including wheel trucks 35, 36 are secured in any suitable manner.

Each of the trucks 35, 36, which may be in large measure of conventional construction includes two pairs of flanged wheels 37, 38, each pair of wheels being joined integrally by an axle 39. The axles 39 are suitably journalled in bearing boxes 41 secured in spaced relation to side frames 42. The side frames 42 are in turn secured together in spaced relation by a cross frame 43 having a center bearing and connecting member, indicated generally at 44, whereon the end portions of the frame of the car B are seated and suitably connected by means (not shown).

By inspection of Figure 1, it will be seen that the floor 31 of the flat car B has a horizontal portion 45 at either end of the car, the said portion 45 extending inwardly and shelving downwardly as at 46, to merge into a horizontal, central portion 47, the space defined between the side sills and the flooring constituting a well wherein the landing gear of each trailer is accommodated.

Fastened in spaced relation on the central portion 47 of the floor 31 is a base plate or member 48 having an H-shaped channel member 51 fastened to either of its ends. The upper half of each H-shaped member 51 has vulcanized to each side thereof a substantially rhomboid-shaped in cross section rubber cushion 52 to the inner faces of which is similarly secured a bracket or bearer member 53 adapted to partially embrace the adjacent portion of the trailer axle 23 and also engage the adjoining spring clip 22, thereby anchoring the rear end of each trailer in the well of the car B.

At the other end of the frame of the car B a pair of side cushioning bearer members 54 is fastened. The bearer members 54 individually comprise two angle iron members 55 between and to the inner faces of each of which a substantially rhomboid-shaped in cross section cushion of rubber 56 is vulcanized. A T-shaped member 57 has its shank vulcanized to the inner faces of the rubber cushions 56 and its upper surface supportingly engaged with the base of the trailer A. Another pair of bearer members 58, 59, similar to and located between the bearers 54, 55, are also fastened to the frame of the car B, and are interconnected by a plate 61 having a hole (not shown) adapted to snugly receive the stem of the trailer fifth wheel mounting pin 18. The plate 61 at each end thereof has depending flanges or projections 62 which are arranged and vulcanized to the rubber cushions 63 of the bearers 58, 59 in a manner similar to the side supports already described. It will be understood that the members 57 and 61 and the members 54, 55, 58 and 59 may be bolted or otherwise rigidly secured, respectively, to the truck body and rail car which they engage so that the rubber cushions resist lateral and longitudinal as well as vertical movements between the car and truck body with a cushioning action. The trailer A in this manner is securely anchored at its front and rear ends to the flat car B, while at the same time the rubber cushioned supports maintain the tires of the trailer out of contact with the floor of the flat car, thereby preventing injury and/or wear to the tires while the trailer is being conveyed by the rail car.

In accordance with the present system of rail-highway transportation, long hauls are made by rail cars, the trailers A being carried by the rail cars. Localities inaccessible to the railroads are reached by tractor-trailer combinations, the freight being picked up and brought to the railroad stations where the trailers A with their loads are bodily lifted by a crane or other suitable hoisting apparatus through the intermediary of the eye bolts 26, and placed in the rail car, as illustrated. This operation, it will be observed, obviates the necessity for removing the freight from the trailer and reloading it in the freight car. When the rail car has arrived at its destination and alongside the railroad landing platform, the doors 15, 16 of the trailers are opened and the freight unloaded directly on the railroad platform. The trailers, after emptying, are ready for reloading in the same manner from the railroad platform.

This system further contemplates the placing of a plurality of rail cars opposite and abreast the railroad platform with the side doors of the trailers in the several rail cars, in transverse alignment, so that the said trailers may be loaded and unloaded with freight by passing transversely through one trailer to another if desired. A great saving in time and labor may thus be effected both in the loading and unloading steps, since the freight in no instance contacts the rail car, but is directly conveyed from or into each trailer. By supporting the trailers so their floors are on a level with the upper surface of the railway platforms and by further providing the side doors 15, 16 and lifts 26 on the trailers, a coacting relationship between the rail cars, trailers and railway platforms is established, which permits a flexible and expeditious handling of freight affording advantages not possible to conventional tractor-trailer and railway combinations for the handling of freight.

I am aware that the invention may be embodied in other specific forms without departing from the spirit or essential attributes thereof, and it is accordingly to be understood that the present embodiment is illustrative and not restrictive, reference being had to the appended claims, rather than to the foregoing description, to indicate the scope of the invention.

What I claim is:

1. A method of transporting freight by combined rail car and road vehicle such as tractor-trailer operation, which consists in using a road vehicle with a side door, supporting and conveying the said vehicle on a rail car at a height sufficient to establish the vehicle's floor level at substantially the same plane with that of usual height railway loading platforms, loading or unloading respectively the vehicle through said side door directly from the platforms but without removal of the road vehicle from the rail car at one end of a rail haul, while the road vehicle at the other end of the rail haul is removed from the rail car and driven by road to the place of unloading or loading.

2. The combination with a highway vehicle such as a trailer and a rail car, of means arranged in the rail car and coactable with other means secured to the road vehicle for supporting same at a height sufficient to establish the floor level of the highway vehicle on the rail car approximately on the same plane as usual height railroad loading platforms accessible to the rail car; whereby, at one end of a rail haul, freight may be loaded into or unloaded from the road vehicle and directly via the platforms without contacting the rail car, whereas, at the other end of a rail haul, the road vehicle may be removed from the rail car, driven by road to a location remote from the rail tracks and be unloaded or loaded there.

3. In a combination of the character described of a rail car and a road vehicle such as a trailer, means adapted to support and anchor the vehicle on the rail car so as to locate the vehicle's floor above the top of the rail car but approximately on a level with usual height railway loading platforms accessible to the rail car, other means adapting the vehicle to be bodily lifted from and replaced in the rail car, and additional means including side doors arranged on the vehicle for loading and unloading it directly from the platforms and through the said doors.

4. In a combination of the character described, a flat-type rail car, means including a well and supporting members arranged in the car; said car comprising supporting members which extend at the longitudinal sides of the car across the region of the well at a height above the level of the bottom of the well; tractor trailer having running gear, including wheels and springs anchored in the well and mounted on the members, and side doors, means arranged in the trailer and adapted to provide access to the interior and to the floor thereof; whereby the said floor of the trailer is located at a height substantially the same as that of usual height railway loading platforms accessible to the rail car.

5. The combination with a rail car of the character described, and having a frame including side sills, means joining said side sills and adapted to provide a well therewith, and cushioning means arranged in the well and on the frame; said cushioning means being adapted to resiliently support an automobile trailer; of an automobile trailer, said trailer having side walls and a floor joining said side walls, doors arranged in the side walls, and running gear beneath said floor, said running gear being substantially accommodated in the well of the rail car; whereby the floor of the trailer is held at a plane substantially flush with the plane of usual height railway loading platforms accessible to the rail car.

6. The combination with a flat-type rail car having a well and means for accommodating and anchoring the running gear of a trailer and supporting the said trailer at a height effective for loading freight directly from a railway platform into the trailer without removal of the trailer from the rail car; of means including a freight-sustaining floor arranged on the trailer and substantially flush with the usual height railway loading platform, whereby freight may be conveyed directly and expeditiously from the platform to the floor of the trailer and vice versa from the floor to the platform.

7. In a railway flat car having elevated end portions and a central well; cushioning means on said end portions; cushioning means in said well; said cushioning means on the end portions being adapted to engage coacting means on and to resiliently support the weight of the front ends of a pair of semi-trailers placed back-to-back on the car with their rear wheels in the well; said cushioning means in the well being adapted to engage coacting means other than the tires, on the rear ends of the trailers and to resiliently support the weight of same in relieving the tires of the rear wheels of the trailers from their supporting function.

CLARKE P. POND.